US007129662B2

(12) United States Patent
D'ayot

(10) Patent No.: US 7,129,662 B2
(45) Date of Patent: Oct. 31, 2006

(54) METHOD OF OPERATING A CONTROLLED ROLLER BLIND SUPPLIED BY WAY OF A WIRE CONTROL INTERFACE

(75) Inventor: Geoffroy Dumont D'ayot, Cran Gevrier (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 11/195,969

(22) Filed: Aug. 3, 2005

(65) Prior Publication Data

US 2006/0033460 A1 Feb. 16, 2006

(30) Foreign Application Priority Data

Aug. 10, 2004 (FR) .................................. 04 08799

(51) Int. Cl.
*G05B 5/00* (2006.01)

(52) U.S. Cl. .................. 318/468; 318/568.1; 318/264; 318/265; 318/266; 318/466; 318/467; 318/280

(58) Field of Classification Search ................ 318/468, 318/568.1, 264, 265, 266, 286, 466, 467, 318/567, 280; 160/1
See application file for complete search history.

(56) References Cited

U.S. PATENT DOCUMENTS

| | | | | |
|---|---|---|---|---|
| 5,467,266 A * | 11/1995 | Jacobs et al. | ................. | 700/56 |
| 6,078,159 A | 6/2000 | Valente et al. | .............. | 318/468 |
| 2005/0109591 A1* | 5/2005 | Van Vooren et al. | ....... | 200/1 B |

FOREIGN PATENT DOCUMENTS

| | | |
|---|---|---|
| DE | 198 31 119 A1 | 1/2000 |
| EP | 0 426 577 A1 | 5/1991 |
| EP | 0 718 730 A2 | 6/1996 |
| EP | 0 822 315 A2 | 2/1998 |
| EP | 0 997 605 B1 | 5/2000 |
| FR | 2 808 834 | 11/2001 |

* cited by examiner

*Primary Examiner*—Karen Masih
(74) *Attorney, Agent, or Firm*—Frommer Lawrence & Haug LLP; Ronald R. Santucci

(57) ABSTRACT

The method of operating an actuator intended to drive a movable element for closure, for privacy or for solar protection or a projection screen, comprising a motor, an electronic unit for controlling the supply to the motor and a control interface furnished with at least one first key and a second key, the pressing of which keys usually causes a movement of the motor in a first direction, respectively, a movement of the motor in a second direction, is one wherein, in at least one second mode of operation, the movements of the motor in the two directions are controlled by presses of the first key exclusively.

16 Claims, 5 Drawing Sheets

| Setting | Displacement | Enable |
|---|---|---|
| Top end of travel | Press key 8a | Press key 8b for 2s |
| Bottom end of travel | Press key 8a | Press key 8b for 2s |
| Direction of rotation | Press key 8a | Press key 8b for 5s |
| Intermediate position | Press key 8a | Press key 8b for 2s |
| Reset to zero | | 3 successive presses of key 8b for 2s |
| Exit configuration mode | | Press key 8b for 10s |

Fig.3

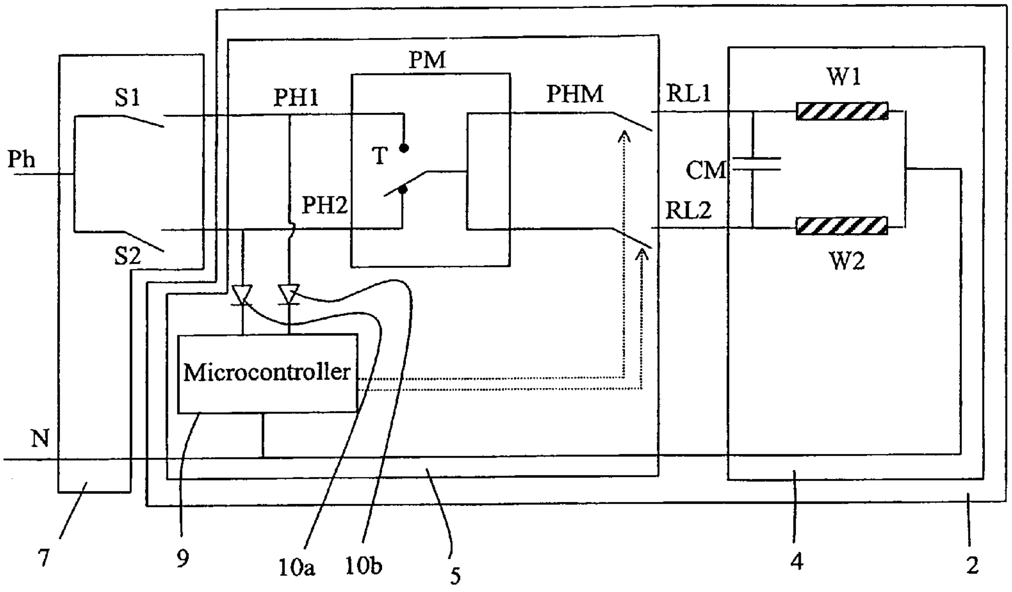
Fig. 4
Fig. 5
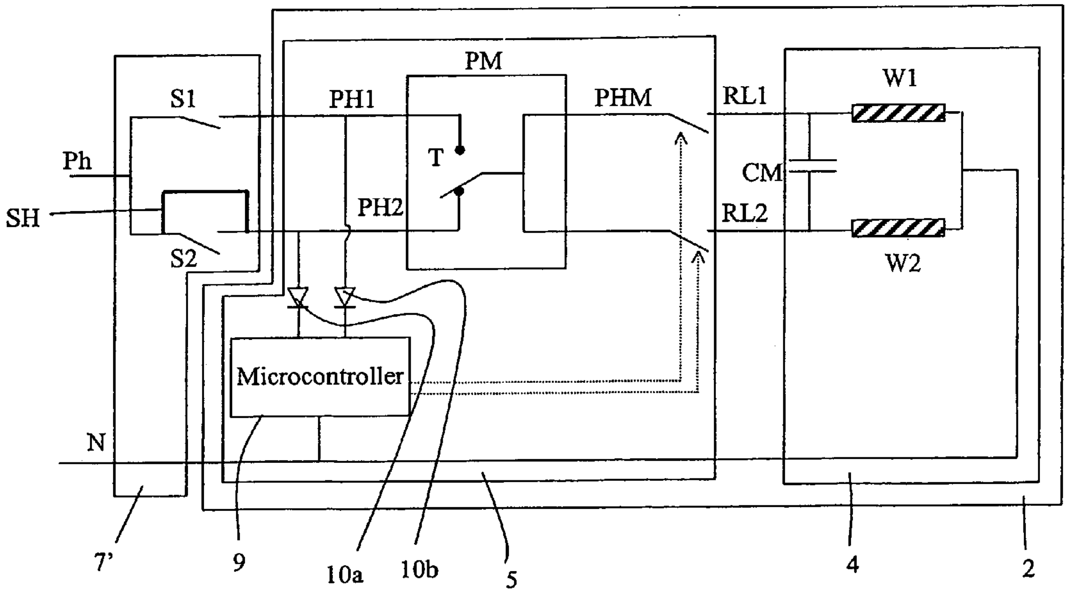

METHOD OF OPERATING A CONTROLLED ROLLER BLIND SUPPLIED BY WAY OF A WIRE CONTROL INTERFACE

This application claims priority benefits from French Patent Application No. 04/08799 filed Aug. 10, 2004.

1. Field of the Invention

The invention relates to a method of operating an actuator intended to drive a movable element for closure, for privacy or for solar protection or a projection screen, comprising a motor, an electronic unit for controlling the supply to the motor and a control interface furnished with at least one first key and a second key, the pressing of which keys usually causes a movement of the motor in a first direction, respectively, a movement of the motor in a second direction. The invention also relates to an actuation unit and to an actuator for the implementation of the method.

Such actuators are used to maneuver, by virtue of the mechanical energy provided by the motor, movable elements for closure, for privacy or for solar protection. A user can control the displacements of this element by presses of the control keys of a control interface.

In the cases of very simple control interfaces comprising only two keys associated with the two directions of displacement of the element, it appears to be necessary to provide a specific tool making it possible to configure the actuator, by defining, for example:

- the configuration of the control interface so as to ensure that an action on a key of the interface that is to drive the movable element upward actually does bring about an upward movement of the movable element (if necessary inversion may be envisaged by ergonomics or by manual rewiring),
- the learning of the direction of rotation (necessary even though the movements of the movable element correspond to the presses of the keys of the control interface) if the actuator comprises means of electronic abutment detection having a different behavior depending on whether the movable element reaches the top end of travel or bottom end of travel. Specifically, the actuator does not know its direction of orientation, seeing as it may have been mounted on the right or the left),
- the setting of end of travel stops,
- the reinitialization of the end of travel stops and/or of the directions of rotation,
- the resetting of end of travel stops,
- the setting of an intermediate position.

These configuration operations may be performed upon the installation of the actuator, for example upon the first energizing of the actuator, but also during the life cycle of the product during maintenance operations for example. Certain configuration steps such as the recordings of end of travel positions may be performed automatically if the actuators are furnished with electronic means that so permit.

It is apparent that it is very beneficial to define a method of operation making it possible to avoid the requirement of a specific configuration tool. This method must make it possible to carry out manual configuration operations or to instigate automatic configuration operations while resorting only to the control interface of the actuator.

The control interface must then ensure, in addition to the setting-adjustment functions listed, the functions of control of displacement of the movable element upward, of displacement of the movable element downward and of halting of the displacement of the movable element. Even in a programming mode and irrespective of the method of entering this mode, it must be able to displace the movable element upward and downward so as to be able to enable configurations or record positions. It is also possible to define ergonomics which make it possible to enable configurations or record parameters or positions without actually changing operating mode. It must not be possible to carry out these enablings and recordings in an inappropriate manner.

Additionally, it is beneficial to supply the actuator with electrical power by way of the control interface. This makes it possible to limit the wiring operations and to limit the number of wires that must be fed into the casing of the actuator. The drawback related to this construction is obviously that the actuator is supplied only at the time of user command or of a command of an automation mechanism.

2. Prior Art

Known for example, from patent application EP 0 822 315, the content of which is herein incorporated by reference, is a device for controlling the supply to an asynchronous electric motor in which a short-circuiting of the phase lines, allowing the rotation of the motor in a first direction and in a second direction by simultaneously pressing the keys controlling the rotation of the motor in the first direction and in the second direction, places a control unit in a configuration mode. Once in this configuration mode, the rotation of the motor is controlled by presses of the keys serving to control the rotation of the motor in the control mode. Such a device can only operate with certain types of control boxes alone. In particular, this device cannot operate with control boxes of inverter type with fixed or momentary position with mechanical exclusion.

Known from patent U.S. Pat. No. 6,078,159, the content of which is herein incorporated by reference, is a device for maneuvering a closure element. The device comprises a control box furnished with two keys making it possible respectively to control the displacements of a movable element in a first direction and in a second direction. To place this device in a configuration mode, it is necessary to actuate one or other of the keys at least twice within a predefined time slot less than the duration of actuation allowing the control of the movement of the movable element. Thus, when one wishes to control the displacement of the movable element, it is necessary to actuate the control key for a duration greater than that of the predefined time slot. This kind of procedure allowing the device to switch to a configuration mode is fairly difficult to implement when the control box is a fixed-position inverter.

Known from patent FR 2 808 834, the content of which is herein incorporated by reference, is a device for controlling a motorized privacy element. This device comprises a remote control allowing the user to send orders for moving the motorized element. It furthermore comprises means dedicated to its reprogramming. These means comprise a shunt making it possible to link the phase conductor of the power supply cable to an input of a control circuit. The durations for which the shunt is on are measured to determine their significances (change of operation mode, enabling of parameters or of positions, etc). In this device, the movements of the motorized element may be controlled sequentially by a backup pushbutton when the remote control is deficient. This pushbutton consequently constitutes an additional backup control interface.

Known from patent application EP 0 718 730, the content of which is herein incorporated by reference, is a device for controlling various motorized privacy elements. A particular sequence of presses of the pushbuttons attached to an element making it possible in a mode of control to control the upward or downward displacement of this element makes it possible to toggle this element into a configuration mode, to attach it to a group of elements and to define its role (master or slave) in this group.

Known from patent application EP 0 997 605, the content of which is herein incorporated by reference, is a device for controlling a motorized privacy element. This device comprises a remote control furnished with pushbuttons. The commands associated with the pushbuttons depend on the active state or on the mode of operation of the remote control and differ according to them. These pushbuttons are associated, as a function of the active state of the remote control as determined by commutators, with various actions of control and of configuration of the motorized element.

Also known from patent application DE 198 31 119, the content of which is herein incorporated by reference, is a garage door actuator device comprising an interface furnished with a control key and with a programming key. The control key serves to control the supply to the motor of the actuator and the programming key serves to configure the device. Other functions may be obtained through ergonomics of specific presses of these keys. Such a device is rather impractical since it always necessitates sequential control of the movements of the garage door.

SUMMARY OF THE INVENTION

The aim of the invention is to provide a method of operation of an actuator making it possible to alleviate the drawbacks cited previously and to improve the methods of operation of the actuators known in the prior art. In particular, the invention proposes a method of operation of an actuator in which the configuration and the reconfiguration of the actuator are easy and which makes it possible to retain functions of displacement of the actuator by way of the control interface and to enable settings to be adjusted without any risk of activation of a control key causing a movement of the actuator. Furthermore, it is desirable that the method of control make possible the use of a control interface of very simple structure (for example consisting of a box furnished with two keys) and that this method endow this interface with a significant number of functions. It is finally desirable that this method be implementable by a device comprising an interface of any type whatsoever and, in particular, of the type whose keys consist of pushbuttons, of double switches with maintained position or of toggle switches.

The method of operation according to the invention is one wherein in at least one mode of operation, the movements of the motor in the two direction are controlled by presses of the first key exclusively.

The actuation unit according to the invention is intended to drive a movable element for closure, for privacy or for solar protection or a projection screen. It comprises a motor and an electronic unit for controlling the supply to the motor furnished with two phase terminals and intended to be linked to a control interface furnished with at least one first key and a second key in order to constitute an actuator that can operate according several modes. It is one wherein the electronic unit comprises hardware means and software means for the implementation of the method defined above.

The actuator according to the invention comprises an actuation unit defined above and a control interface furnished with at least one first key and a second key.

BRIEF DESCRIPTION OF THE DRAWINGS

The appended drawing represents, by way of examples, a mode of execution of the method of operation according to the invention and various modes of embodiment of the device for implementing the method.

FIG. 3 is a table summarizing the various ergonomics to be implemented to carry out certain operations of configuration of an actuator operating according to this mode of execution of the method according to the invention.

FIG. 4 is a detailed diagram of an embodiment of an actuation device.

FIGS. 5 to 7 are detailed diagrams of various alternative embodiments of an actuator.

DETAILED DESCRIPTION OF THE PREFERRED EMBODIMENT

Figure 1:
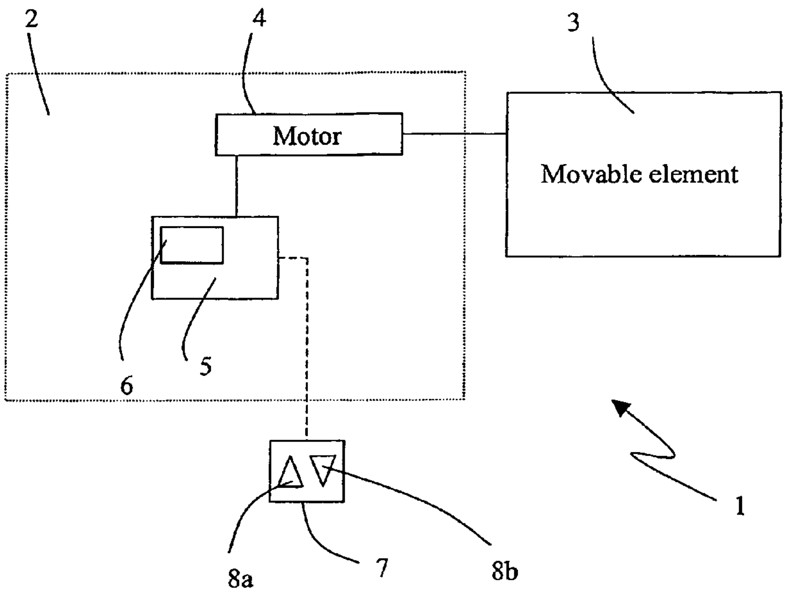
FIG. 1 is a diagram of a mode of embodiment of an actuation device for implementing the method according to the invention.

An actuator 1 is represented diagrammatically in FIG. 1. It comprises mainly a control interface 7 and an actuation unit 2 comprising an electronic control unit 5 and a motor 4. The actuation unit is tied mechanically, possibly by way of a reducing gear, to a movable element 3 for closure, privacy or solar protection or a projection screen so as to drive the displacement of the latter. The movable element 3 may in particular consist of a roller blind, a shutter or a door. The electronic control unit 5 is tied to the motor 4, it ensures the command of the movements of the latter by way of its supply. The electronic control unit comprises a memory 6, and moreover has the function of determining the position in which the movable element 3 is to be found at each instant. The actuation unit can comprise for this purpose a counting device associated with a sensor of Hall-effect type or of optoelectronic type for example.

To allow a user to control the movements of the movable element, the latter is provided with a control interface 7. This interface has the form of a box furnished with two control keys. In a first mode of control A of the actuation device, a key 8*a* makes it possible to control the movement of the movable element in a first direction, for example up, and a key 8*b* makes it possible to control the movement of the movable element in a second direction, for example down.

A press of one of the control keys causes in fact the sending of a control command to the electronic control unit, which accordingly commands a rotation of the motor in the direction corresponding to the control order and ultimately the displacement of the movable element 3.

The control interface 7 is linked to an electric voltage source, such as the 230 volts AC mains, by means of two wires. It is also linked by way of three wires to the actuation unit and more particularly to the electronic control unit 5. These wires make it possible to transmit to the actuation unit not only control orders but also the electrical power required for the supply of the electronic control unit 5 and of the motor 4.

The electrical circuit of such an actuator is represented in greater detail in FIG. 4. The control interface 7 is linked to the electrical voltage source by two wires Ph and N. On the wire Ph carrying the phase, two contacts S1 and S2 are connected in parallel. They are linked mechanically to the keys 8*a* or 8*b* and are, when quiescent, normally open. Downstream, these contacts S1 and S2 are respectively connected to two conductor wires PH1 and PH2 linked to the electronic control unit 5. A wire N carrying the neutral passes through the control interface and is connected to the electronic control unit. A press of the key 8*a* causes the closure of the contact S1 and a press of the key 8*b* the closure of the contact S2.

The electronic control unit 5 mainly comprises a microcontroller 9. It is supplied through devices for rectification and regulation 10*a*, 10*b* by the voltages existing between the wire N and one of the two wires PH1 and PH2 powering the electronic unit.

The two wires PH1 and PH2 powering the electronic unit may be connected alternately to a supply wire PHM of the motor by virtue of a module for managing the supply PM comprising a bistable relay T. This wire PHM may supply via a controlled switch RL1 a first coil W1 of the motor in parallel with a series arrangement of a second coil W2 of the motor and of a capacitor CM so as to rotate the motor in a first direction and can supply via a controlled switch RL2 the second coil W2 of the motor in parallel with a series arrangement of the first coil W1 of the motor and of the capacitor CM so as to rotate the motor in a second direction. The controlled switches RL1 and RL2 may consist of power transistors or of relays. The states of the bistable relay T and of the controlled switches RL1 and RL2 are controlled by outputs of the microcontroller 9. By virtue of the management module PM, when the contact S1 alone is closed, the motor can be supplied so as to rotate in one direction or in the other by way of the bistable relay T and of one of the controlled switches RL1 or RL2.

The microcontroller comprises means (for example comparators) for determining the voltages available on the lines PH1 and PH2. As a function of this information, it controls by way of its outputs the states of the bistable relay T and of the controlled switches RL1 and RL2.

The control interface 7 may also communicate with the electronic control unit 5 by way of RF waves. In these cases, the control box 7 and the electronic control unit 5 respectively comprise at least one emitter and one receiver of RF waves.

Figure 2:
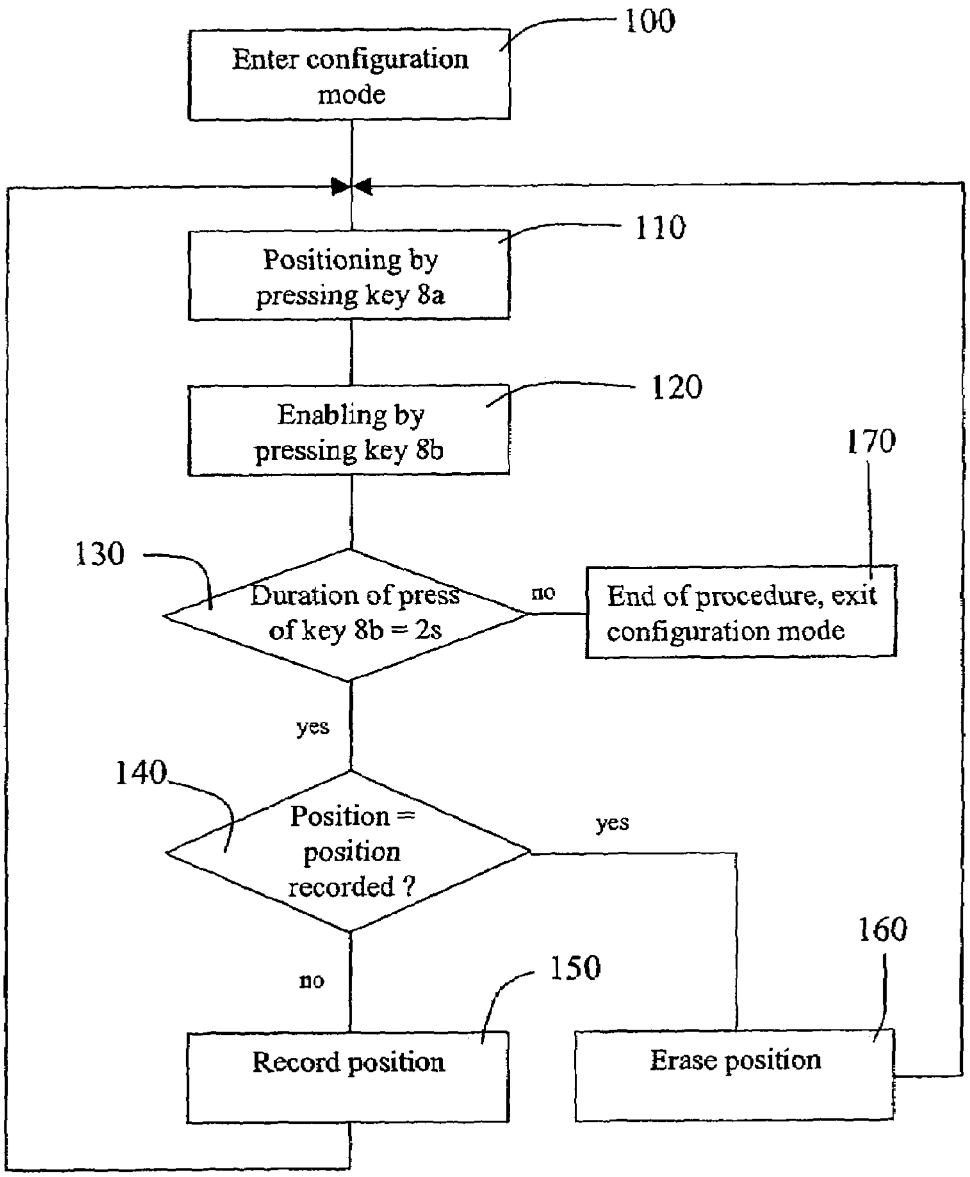
FIG. 2 is a flowchart of a procedure for configuring an end of travel position using a first mode of execution of the method of operation according to the invention.

A first mode of execution of the method according to the invention is represented by the flowchart of FIG. 2. In this flowchart, this first mode of execution is applied to a procedure for configuring an end of travel position.

It is assumed that the actuator is initially in a mode of operation called the "control mode A" and in which a press of the key 8*a* of a control interface causes a movement of the motor whose consequence is an upward displacement of the movable element and in which a press of the key 8*b* of a control interface causes a movement of the motor whose consequence is a downward displacement of the movable element.

Following a particular sequence of presses of the keys 8*a* and 8*b* of the control interface 7, the actuator toggles, during a step 100, into a second mode of operation, called the "configuration mode". In the configuration mode, the functions of the control keys 8*a* and 8*b* are modified with respect to those of the control mode A. For example, an ergonomics such as described in document EP 0 822 315 on lines 4 to 10 of column 5 or in document U.S. Pat. No. 6,078,159 in claim 1 brings about the toggling from the control mode to the configuration mode. The toggling into the configuration mode may also be executed following a first energizing, a mains supply cutoff sequence, and short-circuit between the two phase lines or any other ergonomics of presses of the keys.

In the configuration mode, one of the keys, for example the key 8*a*, ensures the control of the movements of the motor while the other key, for example the key 8*b*; ensures a setting enabling function. The control of the movements of the motor is then sequential: a first press of the key 8*a* brings about an upward movement of the movable element, a second press of the key 8*a* brings about a halting of the movement of the movable element, a third press of the key 8*a* brings about a downward movement of the movable element, a fourth press of the key 8*a* brings about a halting of the movement of the movable element, a fifth press of the key 8*a* brings about an upward movement of the movable element, etc.

The movement may likewise be controlled only while an action is exerted on the key 8*a*. Thus, a first press of the key 8*a* brings about an upward movement of the movable element while this press is maintained. The releasing of this press brings about the halting of the movable element. A second press of the key 8*a* brings about a downward movement of the movable element while this press is maintained. The releasing of this press brings about the halting of the movable element. A third press of the key 8*a* brings about an upward movement of the movable element while this press is maintained. The releasing of this press brings about the halting of the movable element, etc.

By virtue of the functions of this key 8*a*, it is possible to displace the movable element in the configuration mode, to a particular position to be recorded for example or to a position to be modified.

In a step 110, the movable element is therefore displaced to a particular position by pressing the key 8*a*. Fine adjustments of this particular position are possible by way of successive presses of the key 8*a* sequentially controlling to and fro movements of the movable element.

Once the position of the movable element is to the satisfaction of the installer, the latter enables it in a step 120 by pressing the key 8*b*.

In a step 130, a test is carried out to determine whether the duration of pressing of the key 8*b* is equal or deemed to be equal to two seconds. If such is not the case, we go to a step 170 in which other tests are carried out and where, as a function of the results of these tests, the configuration procedure in progress is ended or the configuration mode is exited.

If the duration of pressing of the key 8*b* is equal or deemed to be equal to two seconds, a test is carried out, in a step 140, to determine whether the enabled position corresponds to a position already recorded. If such is the case, the recorded position is erased in a step 160 and we return to step 110.

On the other hand, if the enabled position does not correspond to a position already recorded, then the enabled position is recorded in a step 150.

It is possible subsequently to record another end of travel position or another particular position by repeating the operations described above.

The detection of the end of travel positions may also be carried out automatically if the actuator exhibits electronic means so permitting.

Preferably, in step 150, a visual feedback of information may be provided, for example by slight to and fro movement of the movable element, to signal to the installer the recording of a position.

Once the various parameters of the actuator have been adjusted, the installer causes exit from the configuration mode and return to the control mode A in a step 160 by pressing the key 8*b*. The keys 8*a* and 8*b* then resume their initial functions of control of upward and downward movements.

The table of FIG. 3 summarizes an example of actions making it possible to perform the adjustments of configuration settings of the actuator.

The desired end of travel positions are reached by virtue of presses of the key 8*a* as described previously. They are thereafter recorded by a press of a duration of two seconds of the key 8*b* having in this mode an enabling function. In practice, a press of a key of a duration greater than a second and less than 3.5 seconds is deemed to be a press of two seconds of this key.

One or more intermediate positions of the movable element may be defined in the same manner, possibly starting from the moment at which the end of travel positions have been previously recorded.

In the control mode A, specific ergonomics of actions on the keys are defined so as to bring the movable element into this or these intermediate positions.

To perform a re-adjustment of the end of travel positions and of the intermediate position or positions, it suffices for the installer to command the displacement of the movable element up to the end of travel to be modified, then through a sequence of presses of the enable key (or the two keys of the control box), to erase the recording of this position.

Thereafter it is appropriate to again record a more suitable end of travel position, using the control and enable functionalities of the two keys.

To perform a reset to zero of the settings of the actuator, it is necessary to perform a sequences of presses on the enable key 8*b*. This sequence is for example defined by three successive presses of a duration of two seconds. Following this sequence all the recordings and settings are erased.

Other configuration operations may also be implemented, such as for example the learning of the direction of rotation of the motor that is to be controlled, in the control mode A, by the key 8*a* and of the direction of rotation of the motor that is to be controlled by the key 8*b*. This operation is necessary in certain cases if the management of the end-of-travels is different when the movable element is approaching its top point or its bottom point. Since the actuator can be mounted on the left or on the right with respect to the opening, it must learn which direction of rotation of the motor corresponds to the opening or closing movement of the movable element which it commands. This learning may consist simply in imposing the requirement to set an end of travel, top or bottom, first, but other ergonomics may be provided. For example, the user can position the movable element mid-way (remote from the end-of-travels, whether or not they were adjusted beforehand) by a sequence of presses of the key 8*a* while taking care to terminate the positioning sequence by a movement in a prescribed direction, for example an upward movement of the movable element. Thereafter he enables this latter movement by a press of the enable key 8*b* for a determined time, which may be longer or shorter than a press enabling an end-of-travel position. For example, a press for enabling a direction of rotation of the motor will last five seconds. In practice, a press of a duration greater than 3.5 seconds and less than 7 seconds will be deemed to be a press of five seconds.

Thus, various enable operations may for example be implemented according to the duration and/or the number of presses of the enable key.

Exit from the configuration mode may also be effected by a prolonged press of the enable key. For example, a press for exiting the configuration mode will last ten seconds. In practice, a press of a duration greater than 7 seconds and less than 13 seconds will be deemed to be a press of ten seconds.

Insofar as one and the same key serves for the control of both directions of movement of the motor, the setting of a direction of rotation is not convenient. It is possible to firstly set the ends of travel, by successive presses of the key 8*a*, then to enable them with the key 8*b*. Preferably, a given end of travel will be prescribed (so as to allow the learning by the motor of its direction of rotation). Once the end-of-travel positions have been recorded, we exit the configuration mode. If the direction of displacement observed does not coincide with the indications of the keys (upward movement on pressing the key 8*b* that is to bring about a downward movement of the movable element), a particular ergonomics, for example regarding an end-of-travel position, then makes it possible to modify the direction of displacement of the movable element associated with each of the keys.

Contrary to what was described previously, it is not necessary to allocate in a fixed manner a particular key for the displacement function and the other key for the enable function. This allocation may be dynamic, that is to say may be done logically as a function of certain parameters such as, for example, the key on which the first press is made in the configuration mode for example.

Such an ergonomics of configuration offers appreciable ease of use and allows a wide gamut of possible settings.

Figure 6:
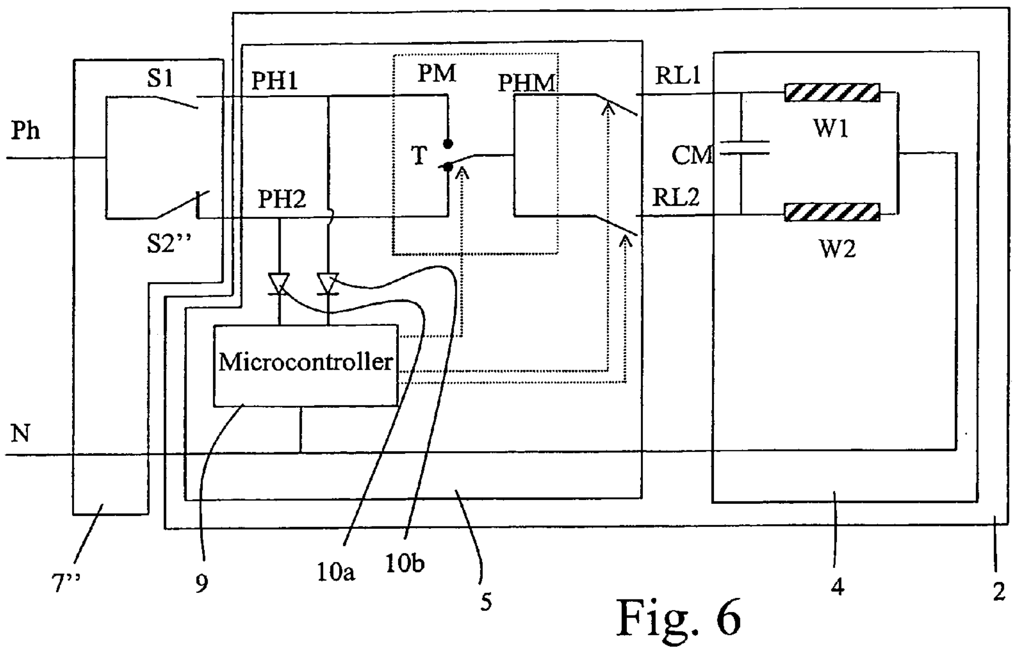
Figure 7:
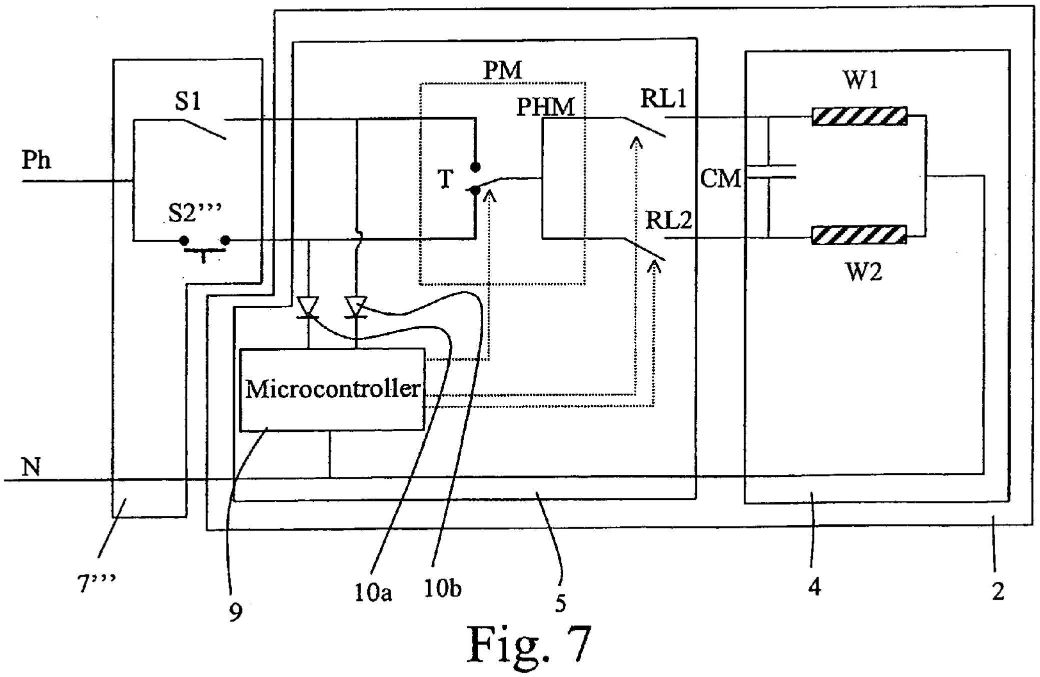

Various alternative actuators are represented in FIGS. 5 to 7. In these figures, the actuation unit is linked to other kind of control interfaces with which, in control modes and in configuration modes, the movements of the movable element are controlled by presses of one control key exclusively.

A first alternative actuator represented in FIG. 5 differs from the actuator described with reference to FIG. 4 in that the contact S2 of the control interface 7' is short-circuited by a shunt SH. The control interface 7' is at the outset identical to the control interface 7 usually making it possible to control respectively by action on the keys 8*a* and 8*b*, the movements of the motor in a first direction and in a second direction. It has simply been modified by the addition of a shunt SH so as to exhibit other functionalities once it is associated with the electronic control unit 5.

The shunt SH allows the electronic control unit 5 and, in particular, the microcontroller 9 to be supplied permanently by the phase wire PH2. Thus, the electronic control unit is capable of measuring durations of opening of the contact S1 as well as durations of closure of this contact. This makes it possible to associate, as well in a control mode B as in the configuration mode, with the key 8*a* tied to the contact S1, a large number of functions other than the functions of sequential control of the movements of the motor. This makes it possible moreover to supply a device for receiving RF orders communicating with automatic measurement devices (for example for measuring wind or luminosity) which are able command a movement of the motor so as to displace the movable element without it being necessary to exert an action on the control interface 7'.

In this alternative, no function is associated with a press of the key 8*b* tied to the contact S2 and, in the control mode B, the movements of the motor are controlled for example sequentially by successive presses of the key 8*a* tied to the contact S1. In this case, it is possible to suppress access to the key 8*b* by using a control interface front panel comprising only an opening making it possible to press the key 8*b*. Thus, the same actuation unit may be used to constitute:

- either an actuator usually controlled by applying the voltage of the phase terminal PH to the first terminal PH1 for a first direction of rotation of the motor and by applying the voltage of the phase terminal PH to the second terminal PH2 for a second direction of rotation of the motor,
- or an actuator in which as well in the configuration mode as in the control mode B, the second terminal PH2 is usually supplied permanently, while the controls are transmitted on the second terminal PH1.

Figure 8:
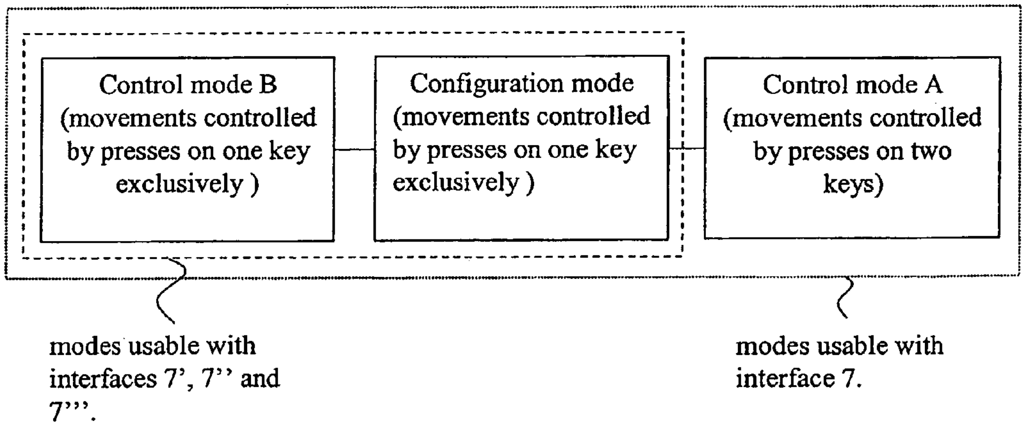
FIG. 8 is a diagram showing the compatibility of the actuation unit according to the invention.

This compatibility of the actuation unit is illustrated on the FIG. 8 on which are represented the various operating modes of an actuator and their conditions of use.

When an installer removes the shunt, the actions on the key 8*b* tied to the contact S2 may again be identified by the microcontroller 9. The presses or the successions of pressing of the key 8*b* may then be associated with various functions such as for example functions used in a mode of configuration of the actuator such as orders for toggling from one mode of operation to another or for enabling a setting.

In a second alternative actuator represented in FIG. 6, the control interface 7 has been modified by replacing the closure contact S2 by an opening contact S2" so as to constitute the control interface 7". The manner of operation of such an actuator is similar to that described previously. Simply, by virtue of this actuator the configuration operations are simplified. Specifically, rather than having to fit or remove a shunt, it suffices in this alternative to press the key 8*b* or to release it. This key may be accessible only when a casing of the control interface has been taken away.

It is then possible to distinguish orders generated by pressing the key 8*a* once, by possibly distinguishing pressing times and quiescent times, since the electronic control unit is supplied. It is also possible to distinguish orders generated by simultaneous pressing of both keys 8*a* and 8*b*. The electronic control unit then being supplied by the phase line PH1, it is also possible to measure the duration of this simultaneous pressing.

The key 8*b* may also be used to make the actuator switch into a configuration mode. For example, by virtue of this key it is possible to simulate a supply cutoff sequence, temporary supplying of the electronic control unit being ensured by capacitor discharge or by pressing the key 8*a*.

In a third alternative actuator represented in FIG. 7, the control interface 7 has been modified by replacing the closure contact S2 by a pusher with two fixed positions S2"' so as to constitute the control interface 7"'.

By virtue of this pusher, the manner of operation of the key 8*b* is sequential as far as supply is concerned: a first press allows the supplying of the actuator, a second press cuts it off. This manner of operation preferably requires visual means of information feedback so as to ascertain the state of the supply switch.

In these last two alternatives, it is for example possible to cause sequences of electronic control unit supply cutoff type by the second phase line PH2 directly by action on the key 8*b* so as to change operating mode.

In addition to cutoffs of supply by the second phase line PH2, it is possible to reproduce particular sequences by presses of the first key 8*a* which cause the electronic unit 5 to be supplied. In this case, the phase line PH1 is linked to the controlled switches RL1 and RL2 by way of the relay T.

The programs for operating the actuation unit are different depending on whether the actuation unit is linked to a control interface according to FIG. 4 or the actuation unit is linked to a control interface according to one of FIGS. 5 to 7. These programs may however be contained in one and the same electronic control unit. In this case mechanical and/or electronic means allow the manual or automatic selection of the operating program suitable for the actuator and, in particular suitable for this actuator's control interface.

The invention claimed is:

1. A method of operating an actuator (1) comprising the steps of: driving a movable element (3) for closure, for privacy or for solar protection or a projection screen, wherein said movable element is driven by the actuator comprising a motor (4), an electronic unit (5) for controlling the supply to the motor (4) and a control interface (7) furnished with at least one first key (8*a*) and a second key (8*b*), in a first mode of operation, the pressing of said keys causes a movement of the motor (4) in a first direction and a movement of the motor (4) in a second direction respectively, wherein, in at least one second mode of operation, the movements of the motor (4) in the two directions are controlled by presses of the first key (8*a*) exclusively.

2. The method of operation as claimed in claim 1, wherein, in the second mode of operation, the movements of the motor (4) in the two directions are controlled sequentially by presses of the first key (8*a*) exclusively.

3. The method of operation as claimed in claim 1, wherein, the pressing of the first key (8*a*) and of the second key (8*b*) causes respectively the movement of the motor (4) in a first direction and in a second direction when the actuator is in a control mode and wherein, when the actuator is in a configuration mode, the movements of the motor are controlled sequentially by presses of the first key (8*a*) exclusively.

4. The method of operation as claimed in claim 3, wherein, in the configuration mode, a press of the second key (8*b*) makes it possible to enable a configuration without causing movement of the motor (4).

5. The method of operation as claimed in claim 3, wherein, in the configuration mode, a press of the second key (8*b*) causes the recording or the erasure of a current position, the resetting to zero of a memory (6) of the actuator (1), the configuration of a direction of rotation and/or the exit from the configuration mode.

6. The method of operation as claimed in claim 3, wherein, in the configuration mode, different durations and/or numbers of presses of the second key (8*b*) define enablings of different configurations.

7. The method of operation as claimed in claim 3, wherein, in the configuration mode, a movement of the motor (4) is caused only while a press is exerted on the first key (8*a*).

8. The method of operation as claimed in claim 3, wherein, in the configuration mode, the allocation of function of the keys (8*a*, 8*b*) is dynamic.

9. The method of operation as claimed in claim 8, wherein the allocation of function depends on the first press performed on the keys (8*a*, 8*b*) in the second mode of operation.

10. The method of operation as claimed in claim 3, wherein the actuator (1) toggles from a control mode to the configuration mode following an action exerted on power supply lines of the motor (4) through the electronic control unit (5).

11. The method according to claim 1, further comprising the use of an actuation unit (2) that can operate according to several modes, wherein the electronic unit (5) comprises hardware means (9, T, RL1, RL2) and software means.

12. The method as claimed in claim 11, wherein the electronic control unit (5) comprises a microcontroller (9)

whose outputs control the states of a bistable relay (T) and of two controlled switches (RL1, RL2) controlling the supply to the motor (4), the two controlled switches being wired in parallel with one another and in series with the bistable relay.

13. The method as claimed in claim 11, which comprises hardware means (9, T, RL1, RL2) and software means allowing it to be linked to a control interface (7') one contact of which is tied to the second key and is short-circuited or to be linked to a control interface (7'', 7''') one contact of which is tied to the second key and is of normally closed type, these means allowing that, as well in a control mode as in a configuration mode, the movements of the movable element are controlled by the application of a voltage to the first phase terminal (PH1) exclusively.

14. The method as claimed in claim 11, wherein, in the modes in which the movements of the movable element are controlled by the application of a voltage to the first phase terminal (PH1) exclusively, the power supply of the electronic unit (5) is carried out on the second phase terminal (PH2).

15. The method as claimed in claim 11, wherein, in the modes in which the movements of the movable element are controlled by the application of a voltage to the first phase terminal (PH1) exclusively, the application of the voltage to the first phase terminal is also used as control commands that are different from movement control commands.

16. The method as claimed in claim 11, wherein a series of applications of the voltage to the second phase terminal (PH2) allows the switching of one operating mode to another.

* * * * *